United States Patent
Corbett, Jr. et al.

(10) Patent No.: US 7,513,536 B2
(45) Date of Patent: Apr. 7, 2009

(54) PIPE GASKET WITH SELECTIVE ECONOMY OF SCALE

(75) Inventors: Bradford G. Corbett, Jr., Fort Worth, TX (US); Gerardo Darce, Heredia (CR); Guido Quesada, San Jose (CR)

(73) Assignee: S & B Technical Products, Inc., Fort Worth, TX (US)

(\*) Notice: Subject to any disclaimer, the term of this patent is extended or adjusted under 35 U.S.C. 154(b) by 0 days.

(21) Appl. No.: 11/217,009

(22) Filed: Aug. 31, 2005

(65) Prior Publication Data
US 2006/0082147 A1 Apr. 20, 2006

Related U.S. Application Data

(60) Provisional application No. 60/607,617, filed on Sep. 7, 2004.

(51) Int. Cl.
*F16L 21/02* (2006.01)

(52) U.S. Cl. .......... 285/374; 285/113; 285/307; 285/338; 285/379; 285/910; 277/608; 277/617

(58) Field of Classification Search .......... 285/95, 285/110–111, 113, 307, 338, 374, 379, 910; 277/608–609, 615, 617–618
See application file for complete search history.

(56) References Cited

U.S. PATENT DOCUMENTS

| | | | | |
|---|---|---|---|---|
| 1,834,102 A | \* | 12/1931 | McCalley | 285/148.8 |
| 1,979,470 A | \* | 11/1934 | Johnston | 156/182 |
| 3,315,971 A | \* | 4/1967 | Sakurada | 277/615 |
| 4,625,383 A | \* | 12/1986 | Vassallo et al. | 29/445 |
| 5,988,695 A | \* | 11/1999 | Corbett, Jr. | 285/110 |
| 6,044,539 A | | 4/2000 | Guzowski | 29/453 |
| 6,105,972 A | \* | 8/2000 | Guzowski | 277/604 |
| 6,113,159 A | \* | 9/2000 | Corbett, Jr. | 285/345 |
| 6,152,494 A | \* | 11/2000 | Corbett et al. | 285/110 |
| 6,299,176 B1 | \* | 10/2001 | Guzowski et al. | 277/604 |
| 6,457,718 B1 | \* | 10/2002 | Quesada | 277/314 |
| 6,499,744 B1 | \* | 12/2002 | Quesada | 277/609 |
| 2004/0232627 A1 | \* | 11/2004 | Corbett, Jr. | 277/602 |

\* cited by examiner

*Primary Examiner*—Aaron M Dunwoody
*Assistant Examiner*—Fannie Kee
(74) *Attorney, Agent, or Firm*—Charles D. Gunter, Jr.

(57) ABSTRACT

A pipe sealing gasket is shown which is designed to be received within a groove provided within a socket end of a thermoplastic pipe in a pipe sealing system. The sealing system includes a male, spigot pipe end which is joined to a mating female belled pipe end. The belled pipe end has an internal groove adjacent a mouth region thereof which is simultaneously formed under temperature and pressure as the mouth region is forced over a forming mandrel and about a sealing gasket located on the forming mandrel so that the sealing gasket is prelocated within the internal groove. The sealing gaskets of the invention have a specially designed sealing capability to seal volume ratio.

7 Claims, 5 Drawing Sheets

PIPE GASKET WITH SELECTIVE ECONOMY OF SCALE

CROSS-REFERENCE TO RELATED APPLICATIONS

The present application claims priority from earlier filed provisional application Ser. No. 60/607,617, filed Sep. 7, 2004, entitled "Pipe Gasket With Selective Economy of Scale," by Bradford G. Corbett, Jr.

BACKGROUND OF THE INVENTION

1. Field of the Invention

The present invention relates generally to sealing gaskets and sealing systems used for pipe joints in plastic pipelines in which a male spigot pipe section is installed within a mating female socket pipe section to form a pipe joint, and to efforts to economize sealing systems for water, sewer agricultural and other fluid pipe sealing systems employing such pipe joints while maintaining acceptable pressure ratings.

2. Description of the Prior Art

Fluid sealing systems for plastic, fluid conveying pipes are used in a variety of industries. The pipes used in such systems are typically formed from thermoplastic materials including polyolefins and polyvinyl chloride (PVC). In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications.

One attempt to insure the integrity of the pipe joint involved the use of a pipe gasket having one region formed of an elastically yieldable sealing material, such as rubber, and a second distinct region formed of a more rigid material, such as a rigid plastic. Other approaches to the problem included the use of a homogeneous rubber ring with a stiffening band which was manually inserted into a mating groove provided on the internal diameter of the rubber ring. Each of these solutions was less than ideal, in some cases failing to provide the needed joint integrity and often contributing to the complexity and expense of the manufacturing operation.

In the early 1970's, a new technology was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The gasket was first positioned on the exterior of a cylindrical forming mandrel. The heated pipe end was forced over the forming mandrel and gasket. The female pipe end was then cooled and the forming mandrel was retracted, leaving the elastomeric gasket seated in an internal groove formed within the completed bell pipe end. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, difficulties were sometimes encountered in the belling operation, particularly with thin wall pipe. In some cases, the belling forces could rupture the thin wall pipe as the heated pipe end was forced over the belling mandrel and a traditionally sized elastomeric gasket seated on the mandrel.

There thus exists a need to provide a sealing gasket of reduced physical proportions for use in some belling operations, particularly those employing thin wall plastic pipe.

There also continues to exist the need to economize the sealing gasket and pipe joint manufacturing processes in order to produce gaskets in large quantities for use in countries worldwide at the lowest possible cost while maintaining an acceptable level of quality.

A need exists for a sealing gasket design which can be used in a Rieber type belling operation, which design provides optimum sealing capacity with the minimum amount of rubber being employed in order to provide a sealing gasket with a selective economy of scale.

SUMMARY OF THE INVENTION

One object of the present invention is to provide a sealing gasket for use in a Rieber type manufacturing operation which gasket has a lower overall profile on the mandrel and which utilizes less mass of rubber in the sealing gasket body. As a result, the improved gasket will not be as likely to damage thin wall pipe during the belling operation. Also, since the gasket utilizes less rubber, it will be more economical to produce in large quantities.

Another object of the invention is to provide a sealing gasket for use in such sealing systems as have been described which achieves acceptable sealing to meet the applicable industry sealing standards, while minimizing the amount of rubber utilized in the gasket body.

Another object of the invention is to provide a sealing system of the above type in which a sealing gasket is prelocated within a groove provided within a female socket end of a thermoplastic pipe during simultaneous belling operations in which the gasket is designed to maintain proper sealing conditions with respect to a mating male spigot end in use.

These and other objects of the invention are achieved by means of a pipe sealing gasket which is designed for receipt within a groove provided within a socket end of a thermoplastic pipe. The gasket includes a ring shaped elastomeric body having a substantially homogeneous composition. The gasket may employ an internal or external reinforcing ring which circumscribes the ring shaped body. One preferred gasket, when viewed in cross section, includes a leading nose region and a generally planar lower compression region. The leading nose region is joined to the lower compression region by a leading sloped surface region which forms an alignment ramp to guide a mating spigot end during insertion and which defines an angle $\alpha$ with respect to a horizontal axis drawn parallel to a central axis of the pipe. The lower compression region is separated from a secondary seal surface by a lip portion which terminates in a trailing surface which defines a second angle $\beta$ with respect to the horizontal axis drawn parallel to the central axis of the pipe.

The gasket is used in a sealing system for joining plastic pipe to form a pipeline. The sealing system includes a first plastic pipe having a male spigot pipe end and a second plastic pipe having a mating female belled pipe end. The belled pipe end has an internal groove adjacent a mouth region thereof which is simultaneously formed under temperature and pressure as the mouth region is forced over a forming mandrel and about a sealing gasket located on the forming mandrel so that the sealing gasket is prelocated within the internal groove. The prelocated sealing gasket has a circumferential gasket body which is located at least partly within the internal groove once the belled pipe end is cooled and the forming mandrel is removed. The sealing gasket has a characteristic sealing capability to seal volume ratio, $\Omega_s$, for seals in axis-symmetric installations which is defined by the formula:

$$\Omega_s = \frac{P_C}{S_u}\sqrt{\frac{D_0}{V}}$$

The sealing gaskets of the invention have a sealing capability to seal volume ratio which is numerically related to the same sealing capability to seal volume ratio of prior art gasket designs by a multiplying factor of 2:1 or more. Most preferably, the multiplying factor is on the order of about 4:1.

Additional objects, features and advantages will be apparent in the written description which follows.

DETAILED DESCRIPTION OF THE INVENTION

A first aspect of the present invention concerns the fact that the preferred sealing gaskets in question are "pre-located" within an internal groove provided in the female "belled" pipe end during the manufacture of the pipe in a "Rieber" style manufacturing process. The prior art Rieber process can best be understood with reference to the simplified illustrations provided as FIGS. 3-6 of the drawings.

Figure 3:
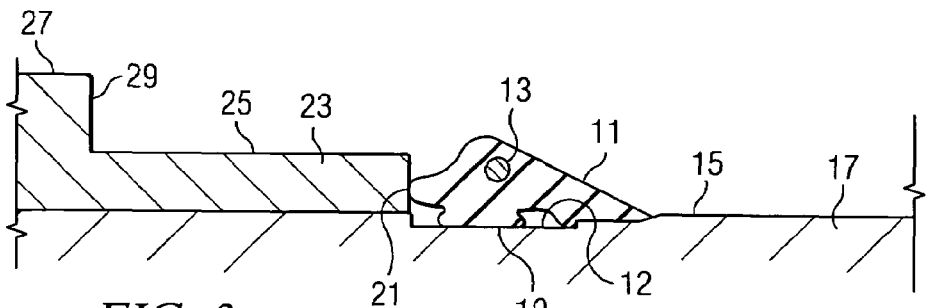
FIGS. 3-6 are simplified, schematic illustrations of the prior art Rieber process for integrally installing a sealing gasket within a simultaneously formed groove within the female socket end of a thermoplastic pipe.

FIG. 3 shows an elastomeric sealing gasket 11 having a steel reinforcing ring 13 in place on the generally cylindrical outer working surface 15 of a cylindrically-shaped forming mandrel 17 used in the belling process. Note that in the prior art process, the gasket 11 sits within a slight external groove 12 formed on the exterior of the forming mandrel 17. The elastomeric gasket 11 can be formed of, for example, rubber and is a ring shaped, circumferential member having a lower compression region 19 and an exposed nose portion 21 which, as shown in FIG. 3, abuts a back-up collar 23 located on the exterior of the forming mandrel 17. The back-up collar 23 has a first generally cylindrical extent 25 which is joined to a second cylindrical extent 27 by a step region 29, whereby the second extent 27 is of greater external diameter than the first cylindrical extent 25, as shown in FIG. 3. Thus, in the first step in the manufacturing process, the sealing gasket 11 is placed onto the working surface of the mandrel 17 and pushed to a position against the back-up collar 23. In this position, the gasket is firmly anchored to the mandrel surface.

Figure 4:
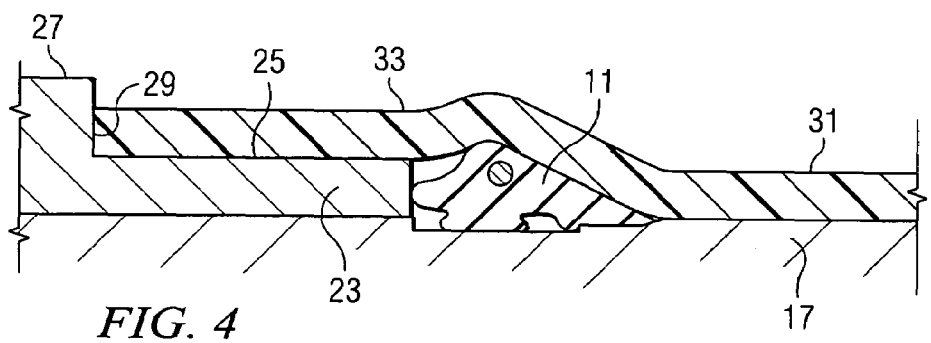

In the second step of the process, the socket end 33 of the thermoplastic pipe 31 is heated and pushed over the steel mandrel 17, gasket 11 and back-up collar 23 (FIG. 4). The hot socket end is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The preferred material is PVC. The socket end 33 flows over the first cylindrical extent 25 of the back-up collar 23 and abuts the step region 29 in the second step of the process.

Figure 5:
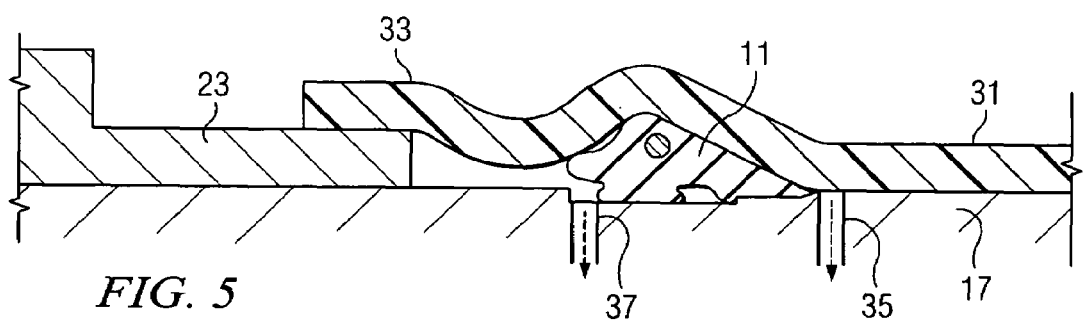
Figure 6:
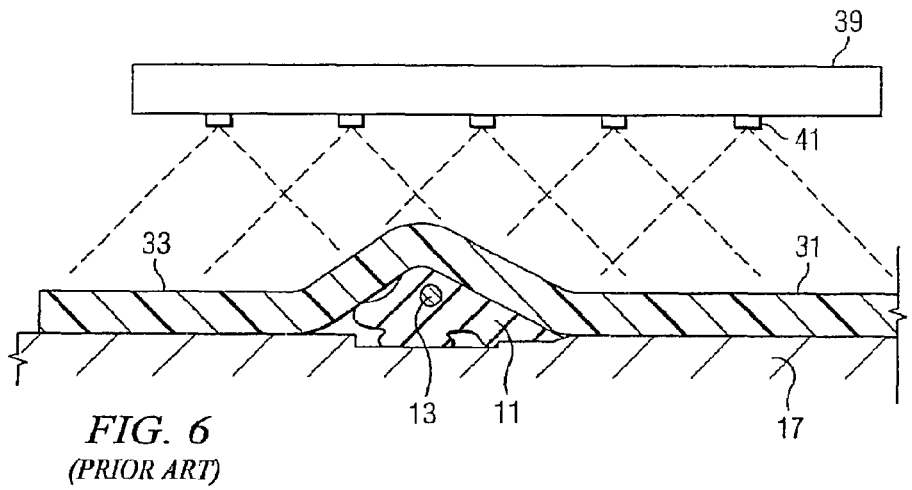
Figure 7:
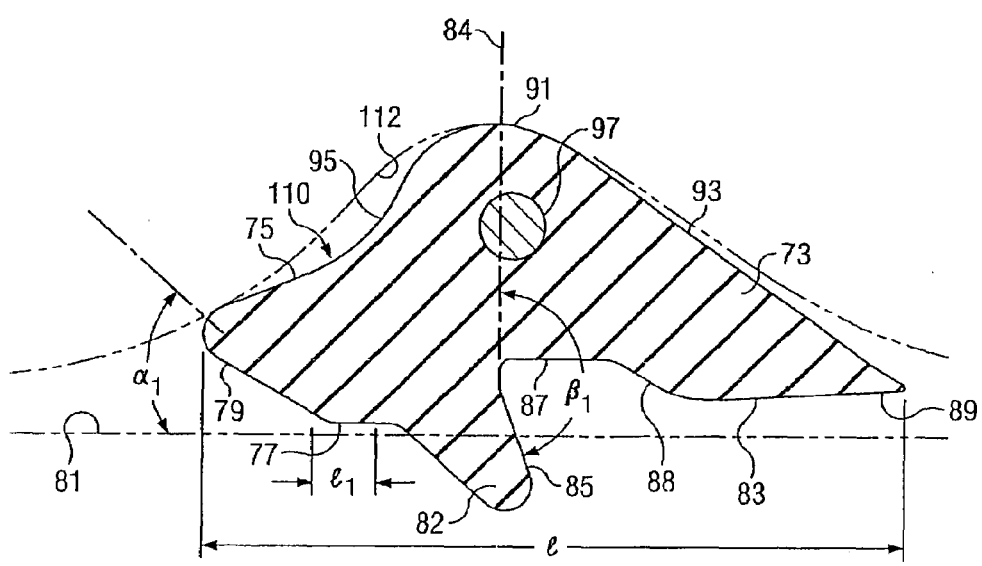
FIG. 7 is a side, cross-sectional view of a sealing gasket of the invention shown in isolated and enlarged fashion for ease of illustration of the geometry thereof.

In the next step of the Rieber manufacturing process illustrated in FIG. 5, the mandrel and pipe begin to move away from the back-up collar 23, allowing the pipe socket end 33 to retract around the mandrel and gasket 11 due to the elastic forces of the thermoplastic material. Typically, vacuum was also supplied through ports 35, 37 which connect the mandrel working surface with a vacuum source (not shown).

In the last step of the process (FIG. 6), the pipe socket end 33 is cooled, as by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal. Because the sealing of the gasket against the socket took place under controlled conditions in the factory, there was no possibility that sand or similar contaminates would penetrate the crucial sealing zone of the gasket during storage, transportation or installation. Also, the gasket is securely pre-located within the mating pipe groove, thereby insuring greater sealing integrity during the ultimate make up of the pipe joint.

The above described Rieber process has been in commercial use since the early 1970's and is described in the above referenced issued United States patents discussed in the Background of the Invention, among other sources. It will thus be well familiar to those skilled in the plastic pipe sealing arts. The process for manufacturing a belled pipe end utilizing the sealing gaskets of the invention is identical to that described above, with the exception that the lower profile and decreased volume or mass of the gaskets of the invention may eliminate any need for an external retaining or positioning groove (12 in FIG. 3) on the exterior of the forming mandrel 17.

Figure 1:
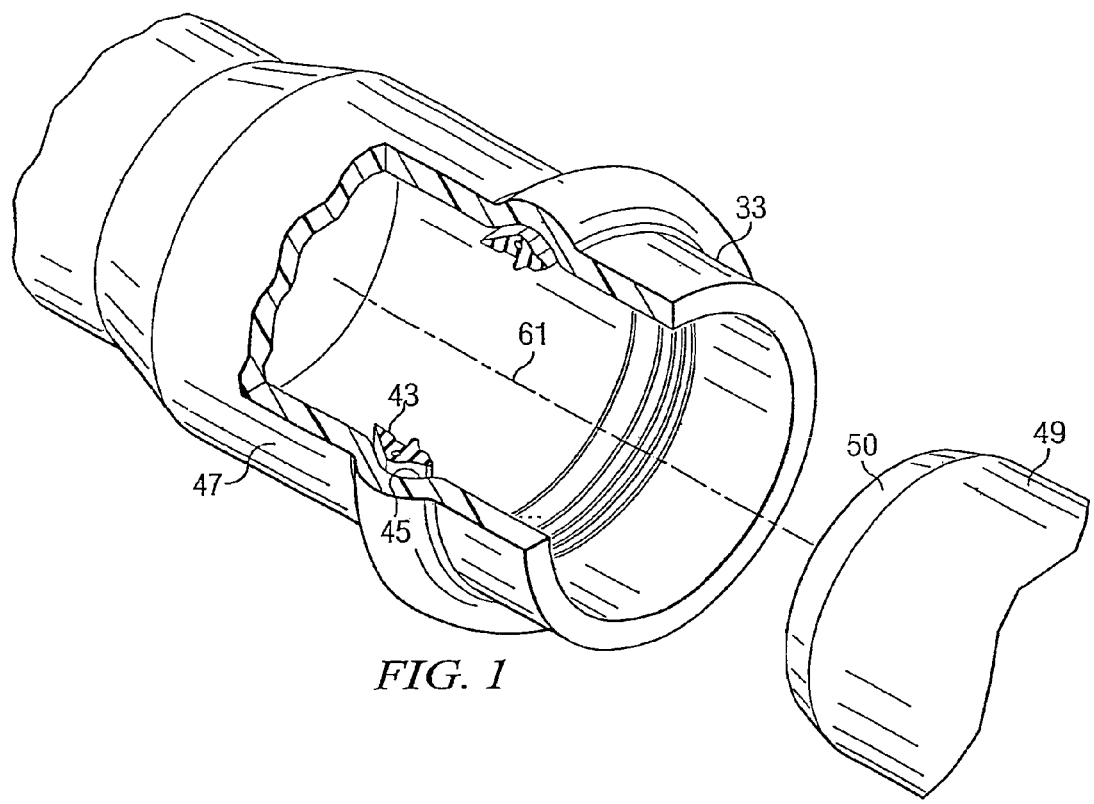
FIG. 1 is a partial perspective view, partly broken away, showing the pipe joint of the invention in which a male spigot pipe end is inserted within a female socket end, the female socket end having a pre-formed groove which receives the sealing gasket of the invention.

Turning now to FIG. 1, a typical pipe joint of the type under consideration is shown in exploded fashion. The belled socket end 33 shows a sealing gasket of the invention, designated generally as 43, which has been installed within the internal groove 45, as described above with respect to the Rieber manufacturing process. The gasket 43 forms a seal with respect to the male, spigot pipe section 49 upon insertion of the male, spigot pipe section within the mouth opening of the mating female pipe section. The male, spigot pipe section 49 may be provided with a chamfered or beveled lip 50, although the improved gasket of the invention has been found to accommodate a non-chamfered spigot end, as well.

Figure 2A:
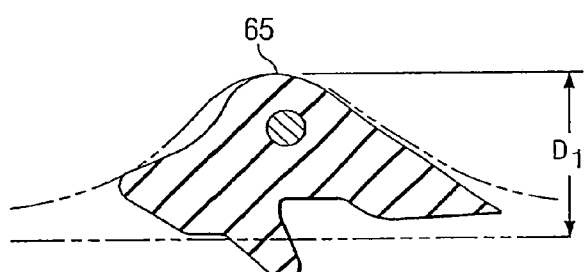
FIG. 2A is a cross-sectional view of a sealing gasket which would have the typical dimensions required for use in the pipe joint of FIG. 1 if sized according to traditional industry practice.
Figure 2B:
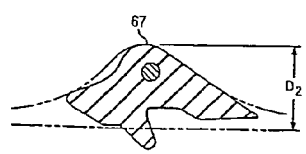
FIG. 2B is a cross-sectional view of a gasket of the invention showing the relative mass thereof as compared to the gasket of FIG. 2A having a similar overall geometry.

The improved features of the sealing gaskets of the invention can best be appreciated with respect to FIGS. 2A and 2B and with respect to FIGS. 7-12. First with reference to FIGS. 7 and 8, the preferred composition and geometry of the sealing gaskets of the invention will be described. The gasket 73 is formed of a generally homogeneous composition, such as from a suitable rubber, rather than including an elastomeric region joined to a rigid plastic region. A natural or synthetic rubber elastomer having a hardness on the order of 50 Durometer has been found to provide an acceptable degree of deformability of the seal. The particular gasket 73 shown in FIG. 7 includes a leading nose region 75 which is joined to a generally planar lower compression region 77 by a leading sloped surface region 79. The sloped region 79 forms an alignment ramp to guide a mating spigot end during insertion and also defines an angle $\alpha_1$ with respect to the horizontal axis 81 drawn parallel to a central axis 61 (FIG. 1) of the pipe. In the example shown, the angle $\alpha_1$ is on the order of about 60° or less, preferably about 45°.

The lower compression region 77 is joined to a secondary seal surface 83 by a lip portion 82 which terminates in a trailing surface 85. The trailing surface 85 defines a second angle $\beta_1$ with respect to a vertical axis 84 drawn perpendicular to the horizontal axis 81. The obtuse angle $\beta_1$ is on the order to 160° in the example shown, although the angle might approach 180° in some cases. The lower compression region 77 is selectively sized to prevent the vertical lip portion 82 from bending backward during bell formation or under high pressure loading. In the preferred example illustrated in FIG. 7, the ratio of the overall length "l" as compared to the length "$l_1$" is preferably about 11.8. for the gasket shown. The trailing surface 85 is separated from the secondary seal surface 83 by an intermediate circumferential groove region 87. The groove region 87 includes an outer wall 88 which forms an obtuse angle with respect to the remainder of the groove region.

The secondary seal surface 83 is a planar circumferential region which terminates in an inside corner 89 of the gasket 73. The inside corner is connected to an outer arcuate region 91 of the gasket 73 by a uniformly sloping exterior gasket surface 93. The outer arcuate region 91 is connected to the nose region 75 of the gasket by a concave curved region 95. The gasket 93 will also typically be provided with a reinforcing element such as the metal ring 97. The cavity 110 (FIG. 7) formed between the concave curved region 95 and the bell groove 112 allows for rubber deformation caused by insertion of the pipe spigot end.

Figure 8:
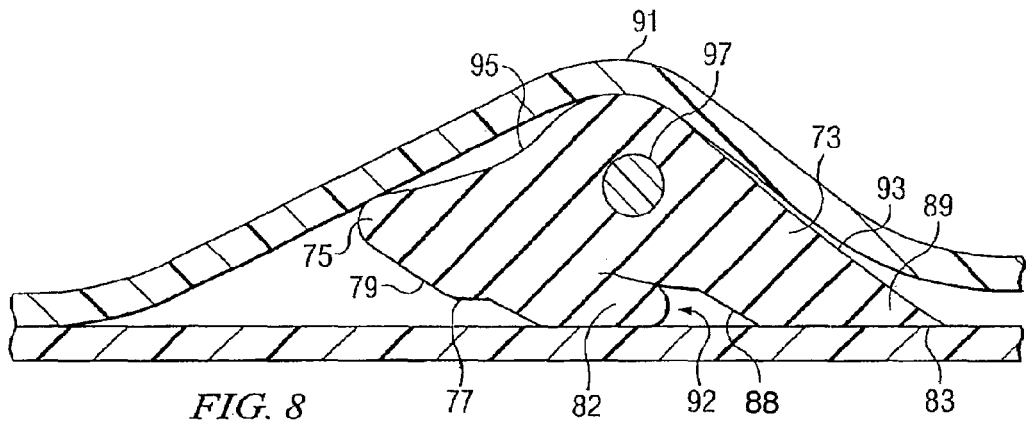
FIG. 8 is a view of the gasket of FIG. 7 shown in the compressed position as the male spigot pipe end is inserted within the female socket end to form a joint of pipe.
Figure 9:
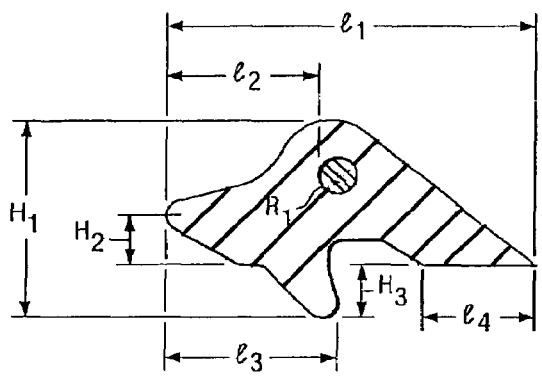
FIGS. 9-12 are side, cross-sectional views of sealing gaskets of the invention in the 1.5, 2, 2.5 and 3 inch diameter sizes showing the relative dimensions and mass of rubber employed in each case.

The angle $\beta_1$ defined by the trailing surface 85 is preferably sufficient to provide a "lip" condition to the seal to allow the lip region 82 to deform inwardly to the extent shown in FIG. 8 while still providing a compression seal. Note that in the compressed state (FIG. 8), the lip region 82 leaves a slight gap 92 adjacent the surface 83 to assist in creating a self-locking effect at high pressure loading within the joint.

Now returning to FIGS. 2A and 2B, it will be noted that the gasket of the invention 67 can be provided with selective economy of scale as compared to a gasket having the same overall geometry (65 in FIG. 2A) but with a greater mass or volume of rubber. This means that a sealing gasket 67 can be provided which provides acceptable sealing capacity, for example to meet or exceed ASTM and other industry standards for sewer, agricultural and in some cases pressure pipe sealing applications, with less mass of overall rubber. Thus, in comparing FIGS. 2A and 2B, it will be noted that the gasket 67 in FIG. 2B has considerably less mass of rubber than the gasket 65 of FIG. 2A. The gasket 67 also presents a lower profile on both the forming mandrel during manufacture and as located within an internal groove in the belled pipe end. The lower mass and lower seal profile can offer advantages during manufacture in that less frictional resistance is present as the heated socket pipe end is being forced over the forming mandrel and over the sealing gasket. The lower profile and decreased mass of the sealing gasket also offers advantages in some pipe joint assembly operations in terms of the resistance caused with respect to the male, spigot pipe during assembly and with respect to the forces caused by the male pipe end upon the pre-located gasket which might tend to twist or displace the gasket.

The gasket 67 is thus especially well adapted for use in a pipe sealing system of the type previously described in which the gasket is "prelocated" within the female pipe groove of a mating female belled pipe end which is preformed under temperature and pressure as the mouth region is forced over a forming mandrel and about a sealing gasket located on the forming mandrel. FIGS. 2A and 2B of the drawings illustrate the previously described lower profile of the sealing gaskets of the invention. As shown in FIGS. 2A and 2B, the distance "$d_2$" is considerably less than the distance "$d_1$." As another way of explaining the "lower profile" aspect of the gaskets of the invention, the preferred sealing gaskets have a seal height ("$h_1$" in FIGS. 9-12) which is greater than about 4 mm and less than about 7 mm for gaskets in the size ranges from 1 inch to 3 inches.

The sealing gaskets of the invention have a characteristic sealing capability to seal volume ratio, $\Omega_s$, for seals in axis-symmetric installations which is defined by the formula:

$$\Omega_s = \frac{Pc}{S_u}\sqrt{\frac{D_0}{V}}$$

Figure 13:
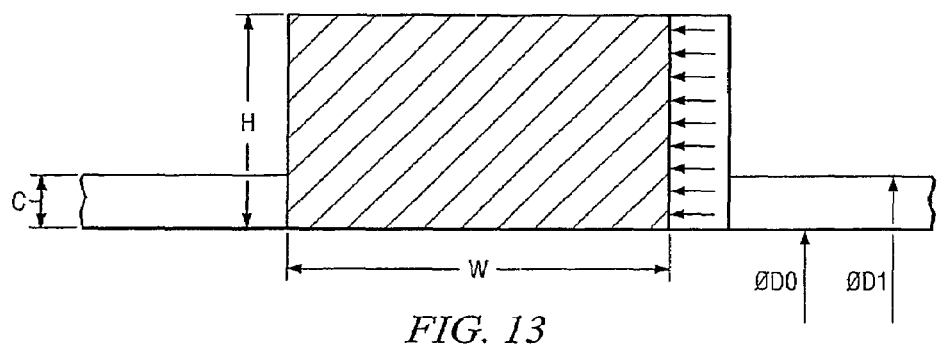
FIG. 13 is a simplified illustration of the basic dimensional relationships of the sealing gaskets of the invention used to derive the formula for sealing capability to seal volume ratio.

The sealing gaskets of the invention have a sealing capability to seal volume ratio which is numerically related to the same sealing capability to seal volume ratio of prior art gasket designs by a multiplying factor of 2:1 or more. Most preferably, the multiplying factor is on the order of about 4:1. The derivation of the ratio $\Omega_s$ can be explained with reference to FIG. 13 as follows:

Basic Parameters

V: volume of the seal

A: cross section area to be blocked by the seal $D_0$: Outside pipe diameter $D_1$: Inside bell diameter c: Mean clearance between bell and spigot $D_2$: inside groove diameter (not used, provided as reference)

P: fluid pressure $T_u$: Ultimate shear strength, equivalent to $S_u/3$

Su: Ultimate axial strength w: Width of gasket h: Height of gasket

Intermediate Relationships $$c = \frac{D_1 - D_0}{2}$$

$$A = \pi(D_0 + c)c = \frac{\pi(D_1^2 - D_0^2)}{4}$$

Structural Seal Efficiency

Structural seal efficiency is defined by comparing the force exerted by the fluid pressure to the maximum force that the seal can resist under pure shear. This is done under the following assumptions:

The friction coefficient is negligible.
The seal is evaluated in the assembled condition.
The seal will not undergo nonlinear deformation as pressure is applied.
The two surfaces being sealed are infinitely rigid and strong.
The groove provided for the seal is sufficient to keep the seal in position, regardless of the seal height h.

There are many different seal failure modes. Only a pure shear failure is considered as being the simplest case. However, other failure modes will be related to the basic parameters used in a similar fashion. The calculation is made for an ideal square-shaped gasket of width "w" and height "h". Under ideal conditions, the width would be just enough for the seal to resist the fluid pressure under pure shear. The force applied by the fluid to the region of the seal subjected to shear is:

$$F_f = \pi P(D_0 + c)c = \frac{\pi P(D_1^2 - D_0^2)}{4}$$

The maximum shear force that the seal can resist is:

$$F_T = \pi w T_u D_1$$

The seal efficiency is defined as:

$$\eta_P = \frac{F_f}{F_T} = \frac{P(D_1^2 - D_0^2)}{4 w T_u D_1}$$

In order to make this relationship applicable to arbitrary geometries, it is necessary to replace the seal width with an expression derived from the seal volume:

$$V = \pi h w(D_0 + h)$$

The following approximations are made in order to obtain a workable relationship:

$$h \approx w$$

$$D_0 + h \approx D_0$$

Then the width can be related to seal volume by:

$$w = \sqrt{\frac{V}{\pi D_0}}$$

Which is simply the square root of the Volume divided by a reference perimeter. The seal efficiency can now be rewritten as:

$$\eta_P = \frac{F_f}{F_T} = \frac{P(D_1^2 - D_0^2)}{4 T_u D_1} \sqrt{\frac{\pi D_0}{V}}$$

The previous expression for structural seal efficiency is more complicated than necessary for seal performance comparison purposes. A simplified expression can be obtained by streamlining the parameter relationships and by dropping the constants. Also, the ultimate axial stress, which is more commonly reported, is used instead of the ultimate shear stress:

$$\frac{(D_1^2 - D_0^2)}{2 D_1} \rightarrow \frac{(D_1 - D_0)}{2} = c$$

$$T_u \rightarrow \frac{S_u}{3}$$

This can be regarded as the most practical seal volume to sealing capability ratio:

$$\Omega_s = \frac{P(D_1 - D_0)}{2 S_u} \sqrt{\frac{D_0}{V}} = \frac{Pc}{Su} \sqrt{\frac{D_0}{V}}$$

If the fluid pressure or the ultimate axial stress are not important, a purely geometric version of the formulation can be used, as long as the seals compared are in the same range of working pressure:

$$\omega_s = \frac{P(D_1 - D_0)}{2} \sqrt{\frac{D_0}{V}} = c \sqrt{\frac{D_0}{V}}$$

A simple expression was then developed to evaluate and compare the sealing capability with respect to a seal's material volume.

For evaluations in which the working pressure is important, it is necessary to know the strength of the seal material, which is represented by the ultimate axial stress. In this case, the following definition is used:

$$\Omega_s = \frac{Pc}{S_u} \sqrt{\frac{D_0}{V}}$$

Seals in the same range of working pressure can be compared by means of a simpler ratio:

$$\omega_s = c \sqrt{\frac{D_0}{V}}$$

Using the above formulas, it is possible to achieve acceptable sealing qualities and pressure ratings with much less mass of rubber in sealing gasket designs. The result is a more economical gasket design. Generally speaking, the volume of rubber which is utilized in the gaskets of the invention is one half or less that previously necessary to meet ASTM 3034 with a gasket which provides a sealing capacity in pounds per square inch of at least 100 psi.

Figure 10:
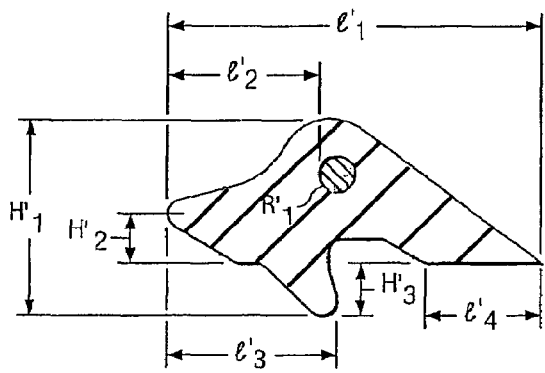
Figure 11:
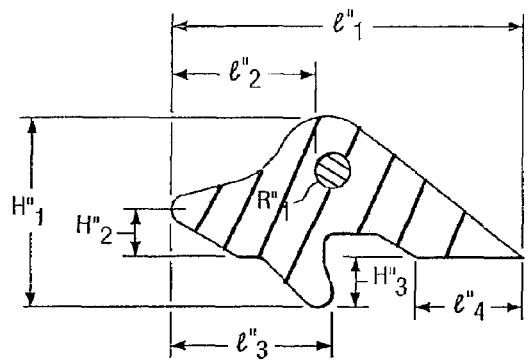
Figure 12:
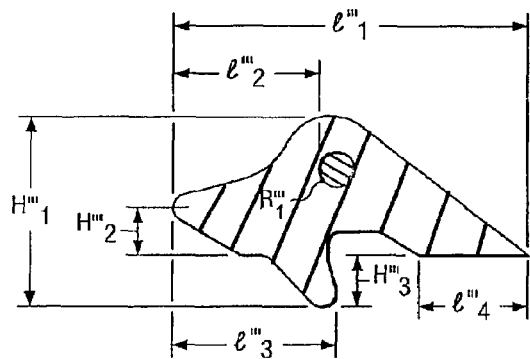

FIGS. 9-12 and Table I which follows show relative dimensions for gaskets of the invention having the improved mass sealing factors for 1.5, 2, 2.5 and 3 inch sealing gaskets. Turning to Table I, each column under the heading "Gasket Size (Diameter)" corresponds to a respective drawing of the gasket illustrated as FIGS. 9-12, respectively. For example, the first gasket size diameter column (1.5") corresponds to the drawing illustrated as FIG. 9, having dimensions defined by seal height "h"and average seal length "l". FIGS. 10-12 utilize the same reference characters "h" and "l" followed by prime (i.e. h' and l'), double prime (i.e. h" and l"), and triple prime (i.e. h'" and l'"), respectively.

TABLE I

| Gasket | Gasket Size (Diameter) | | | |
|---|---|---|---|---|
| Dimension | 1.5" | 2" | 2.5" | 3" |
| $l_1$ | 9.6 | 10.6 | 11.5 | 13.4 |
| $l_2$ | 3.9 | 4.3 | 4.5 | 5.5 |
| $l_3$ | 4.4 | 4.8 | 5.3 | 5.7 |
| $l_4$ | 3.0 | 3.3 | 3.6 | 4.2 |
| $r_1$ | 0.10 | 0.10 | 1.5 | 1.5 |
| $h_1$ | 5.0 | 5.5 | 6.0 | 7.0 |
| $h_2$ | 1.2 | 1.3 | 1.4 | 1.7 |
| $h_3$ | 1.4 | 1.5 | 1.6 | 1.9 |

In addition to a seal height "$h_1$", the sealing gaskets of the invention also have an average seal length "$l_1$", as taken from the above table. The average seal length to height ratio is on the order of 1.92 for gaskets which are manufactured according to the principles of the invention.

Sealing gaskets of the type described utilize significantly less rubber than was previously thought to be necessary to meet ASTM 3034 and other industry standards. In fact, the sealing capacity for a 3 inch pressure gasket made in accordance with the teachings of the invention and which was pressure tested had a higher sealing capacity than the prior art gasket having a greater mass of rubber. This effect is perhaps due to the lower profile of the sealing gasket of the invention within the mating female pipe groove which provides a tighter overall fit for the sealing system.

Belling trials were conducted of 3 inch and 1½ inch pipes. The same belling machine was used for both trials. Three different pipe classes were belled: SDR 26 (160 psi); SDR 21 (200 psi) and Sch 40 (260 psi). The following results were obtained:

TABLE II 1.5" Gasket of the Invention - Test Results

| Test | SDR 26 (160 psi) | SDR 21 (200 psi) | Sched 40 (260 psi) | Comments |
|---|---|---|---|---|
| | ASTM D 3139 | | | |
| Vacuum | OK | OK | OK | — |
| 0.5× Rated Pressure | OK | OK | OK | — |
| 2.5× Rated Pressure | Incomplete | Incomplete | Incomplete | Pipe Ballooned (between 5-8 min test time) |
| Quick Burst | Not tested | Not tested | Not tested | |
| | ASTM F 1365 | | | |
| Infiltration Test | OK | OK | OK | |

TABLE III

3" Gaskets of the Invention - Test Results

| Test | SDR 26 (160 psi) | SDR 21 (200 psi) | Sched 40 (260 psi) | Comments |
|---|---|---|---|---|
| | ASTM D 3139 | | | |
| Vacuum | OK | OK | OK | — |
| 0.5× Rated Pressure | OK | OK | OK | — |

TABLE III-continued

3" Gaskets of the Invention - Test Results

| Test | SDR 26 (160 psi) | SDR 21 (200 psi) | Sched 40 (260 psi) | Comments |
|---|---|---|---|---|
| 2.5× Rated Pressure | OK | OK | Fair | Gasket Extruded for deflection test |
| Quick Burst | OK | OK | Not tested | |
| | | ASTM F 1365 | | |
| Infiltration Test | OK | OK | OK | |

An invention has been provided with several advantages. The pipe sealing systems of the invention provide improvements in integrally formed sealing gaskets of the type which are factory installed within a groove provided within a socket end of a thermoplastic pipe in a Rieber style belling operation. The appearance of the pipe bell is excellent due to the lower mass of rubber in the sealing gasket. The gasket is well positioned within the inside of the bell with no gaps or pockets which can be noticed. The improved sealing gasket of the invention employs dramatically less rubber than the prior art gasket designs allowing for a more economical design. Also, the lower profile of the gasket in the belled pipe internal groove provides a tighter fit which can actually carry greater pressure loads in some situations. Laboratory tests have shown that the gasket design of the invention has an excellent sealing performance, even under axial deflection in the pipe bell. The sealing gasket of the invention also offers excellent resistance to water infiltration.

While the invention has been shown in only one of its forms, it is not thus limited but is susceptible to various changes and modifications without departing from the spirit thereof.

What is claimed is:

1. A sealing system for joining plastic pipe to form a pipeline, the sealing system comprising:
   a first plastic pipe having a male spigot pipe end;
   a second plastic pipe having a mating female belled pipe end, the belled pipe end having an internal groove adjacent a mouth region thereof which is preformed under temperature and pressure as the mouth region is forced over a forming mandrel and about a sealing gasket located on the forming mandrel so that the sealing gasket is pre-located within the internal groove;
   the pre-located sealing gasket having a circumferential gasket body which is located at least partly within the internal groove, and wherein the sealing gasket has a characteristic sealing capability to seal volume ratio, $\Omega_s$, for seals in axis-symmetric installations which is defined by the formula:

$$\Omega_s = \frac{Pc}{S_u}\sqrt{\frac{D_0}{V}}$$

where:
V: volume of the seal
$D_0$: Outside pipe diameter
c: Mean clearance between bell and spigot
P: fluid pressure
$S_u$: Ultimate axial strength wherein the sealing gasket has an average seal length and an average seal height, and wherein the average seal length to height ratio is no greater than 1.927.

2. The sealing system of claim 1, wherein the male spigot pipe end is inserted within the female belled pipe end to form a water tight connection in a municipal water line.

3. The sealing system of claim 1, wherein the sealing gasket has a sealing capacity in pounds per square inch of at least 100 psi.

4. The sealing system of claim 1, wherein the sealing gasket has a seal height which is greater than 4 mm and less than 7 mm for gaskets having a diameter in the range from 3 inches to 6 inches.

5. An improved belled pipe end manufactured with a pre-located internal sealing gasket which is installed within the belled pipe end, the belled pipe end comprising:
   a plastic pipe having a female belled pipe end, the belled pipe end having an internal groove adjacent a mouth region thereof;
   an elastomeric sealing gasket pre-located within the internal groove as the internal groove is formed under temperature and pressure as the mouth region is forced over a forming mandrel and about the sealing gasket located on the forming mandrel so that the sealing gasket is pre-located within the internal groove, the pre-located sealing gasket having a circumferential gasket body which is located at least partly within the internal groove, and wherein the sealing gasket has a characteristic sealing capability to seal volume ratio, $\Omega_s$ for seals in axis-symmetric installations which is defined by the formula:

$$\Omega_s = \frac{Pc}{S_u}\sqrt{\frac{D_0}{V}}$$

where:
V: volume of the seal
$D_0$: Outside pipe diameter
c: Mean clearance between bell and spigot
P: fluid pressure
Su: Ultimate axial strength
   wherein the sealing gasket has an average seal length and an average seal height, and wherein the average seal length to height ratio is no greater than 1.927.

6. The improved belled pipe end of claim 5, wherein the sealing gasket has a sealing capacity in pounds per square inch of at least 100 psi.

7. The improved belled pipe end of claim 5, wherein the sealing gasket has a seal height which is greater than 4 mm and less than 7 mm for gaskets having a diameter in the range from 3 inches to 6 inches.

* * * * *